Oct. 6, 1970          F. G. SHINSKEY          3,531,990
WHEATSTONE BRIDGE FOR MAKING PRECISE TEMPERATURE MEASUREMENTS
Filed Nov. 14, 1966
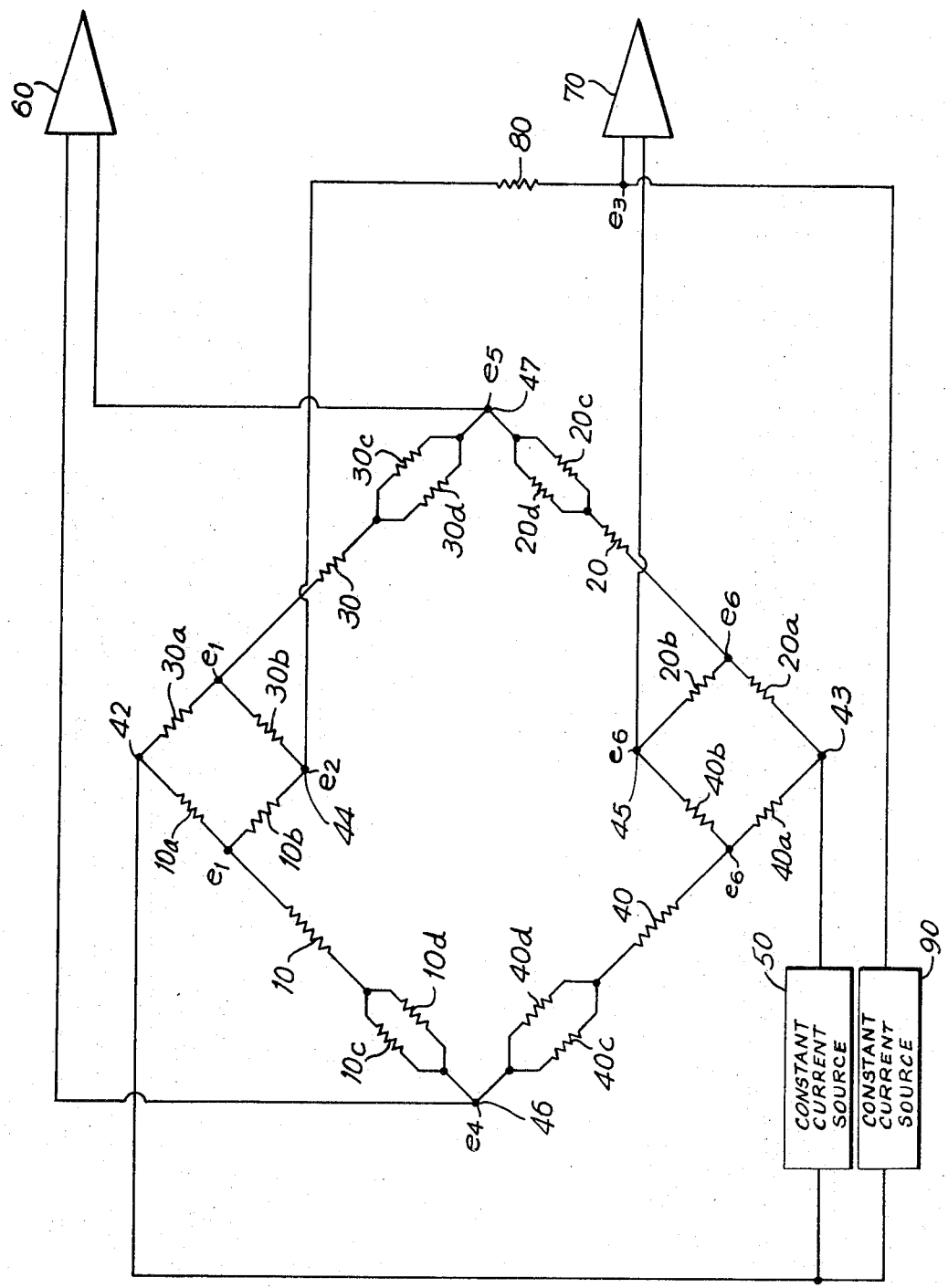
INVENTOR.
FRANCIS G. SHINSKEY
BY
Curtis, Morris & Safford
ATTORNEYS

3,531,990
WHEATSTONE BRIDGE FOR MAKING PRECISE TEMPERATURE MEASUREMENTS
Francis G. Shinskey, Foxboro, Mass., assignor to The Foxboro Company, Foxboro, Mass.
Filed Nov. 14, 1966, Ser. No. 594,185
Int. Cl. G01k 3/02, 3/08, 7/20
U.S. Cl. 73—342
22 Claims

ABSTRACT OF THE DISCLOSURE

A balance Wheatstone bridge comprising four active resistor arms connected by a first set of lead wires to corresponding terminals, the bridge being energized through two of the terminals by a source of constant current, a first voltage measuring device being connected to the other two terminals to provide a measurement of differential temperature and a second voltage measuring device being coupled through a second set of lead wires to the bridge resistors in a fashion to provide a measurement of average temperature. A second source of constant current produces current flow through the second set of lead wires to nullify the effect of voltage drops in the first set of lead wires, the resistance of the first and second set of lead wires being so proportioned as to provide freedom from the effects of changes in lead wire resistance due to environmental temperature changes.

---

The present invention relates to condition measuring apparatus. More particularly, this invention concerns apparatus for measuring temperatures such as the differential and average temperatures of two distinct regions of an industrial process. The invention employs bridge circuitry of the Wheatstone type, but incorporates unique features for obtaining improved operating results.

Wheatstone bridge arrangements have of course been used extensively in the past for making various temperature measurements. For measuring differential temperatures, one of the more common arrangements, sometimes referred to as an "unbalanced" bridge, comprises two active arms each having a resistor responsive to a respective temperature being measured. Each of these two resistors is connected in series with a respective resistor of constant resistance, and the two sets of resistor pairs are connected in parallel with one another. The energizing voltage is applied across the points where the two sets of resistor pairs are connected together, and the differential temperature measurement is made by detecting the voltage between the junctions of the active (temperature-responsive) and nonactive (constant) resistors. For making average temperature measurements with the same bridge, the energizing voltage can be applied through a series-dropping resistor, so that the voltage across the energization points of the bridge will vary with the average value of the two active resistors.

One of the problems with such an arrangement is that the differential-temperature voltage developed by the bridge also is responsive to the average temperature of the two regions being measured. Specifically, changes in average temperature produce changes in the "span" of the differential temperature measurement (i.e. the number of volts change per degree of differential temperature), so that the calibration of the apparatus is correct only at one average temperature. Thus differential temperature cannot be measured with high accuracy, particularly where large swings in average temperature are experienced. Also, with such an unbalanced bridge arrangement, the span of the average temperature measurement (i.e. the number of volts change per degree of average temperature) also will vary with average temperature, so that the output signal is nonlinear and thus not satisfactory for many applications.

It is an object of the present invention to provide new and improved apparatus for measuring process conditions such as the differential temperature between two points. Another object of the present invention is to provide measuring equipment in which measurements respecting the temperatures of two separate places are independent of the average temperature of those places. Still another object of the invention is to provide precision temperature measuring equipment adapted to permit changing the range of measurements in a simple manner. A specific object of the present invention is to provide equipment for measuring with high accuracy both the differential and average temperatures between two distinct regions.

Briefly stated, the apparatus to be described herein comprises a "balanced" bridge arrangement having four active arms. The "hot" resistors and two "cold" resistors are arranged in square bridge configuration with the hot resistors on opposite sides thereof and the cold resistors on the other sides. A constant-current source energizes the bridge and average temperature measurements are made across two diagonally opposed points of the bridge, while differential temperature measurements are made across the two other diagonally opposed points.

In accordance with one aspect of the invention, unique means are provided for assuring that changes in lead wire resistance, due to changes in temperature, do not affect the accuracy of the measurements.

For a better understanding of the present invention, together with other and further objects thereof, reference is made to the following description, considered together with the accompanying drawing which shows a circuit diagram of apparatus for measuring the differential and average temperatures between two points.

This apparatus includes first and second temperature-sensitive resistors 10 and 20 both of which are positioned at one of the two points between which differential temperature measurements are to be made. For purposes of identification only, resistors 10 and 20 will be referred to as the "hot" resistors. These resistors ordinarily are contained within a metallic bulb in heat-transfer relationship with a part of an industrial process, e.g. in a flowing liquid stream, or within the interior of an industrial apparatus such as a nuclear reactor. Typically the resistors will be a considerable distance (e.g. 100 to 500 feet) from the control station where the measurement signal is desired and where the bridge energizing and signal indicating equipment is located. Resistors 10 and 20 may be platinum resistance bulbs or similar devices the resistance of which varies linearly with temperature.

Also included in the circuit are third and fourth temperature-sensitive resistors 30 and 40 both of which are positioned at the second of the two points between which the differential temperature measurements are to be made. Resistors 30 and 40 are similar to resistors 10 and 20, and will be referred to as the "cold" resistors.

The four resistors 10, 20, 30 and 40 are arranged in a four-armed bridge configuration. In particular, resistor 10 is coupled between one end of resistor 30 and one end of resistor 40, while resistor 20 is coupled between the other end of resistor 30 and the other end of resistor 40.

The bridge teminals 42–47 are at the control station and are connected to the resistors 10, 20, 30 and 40 by lead wires identified in the drawing by corresponding reference numerals with differentiating suffixes.

The bridge is energized by current flow through its top and bottom terminals 42 and 43. These terminals are connected to the resistors 10, 20, 30 and 40 by respective lead wires 10a, 20a, 30a and 40a which, because they are relatively long, have a significant electrical resistance and thus are represented symbolically in the drawing as comprising electrical resistance.

An average temperature measurement signal is derived from bridge terminals 44 and 45 which are connected to corresponding ends of the bridge resistors 10, 20, 30 and 40 by respective lead wires 10b, 20b, 30b and 40b. The differential temperature measurement signal is derived from side bridge terminals 46 and 47 which are connected to the other ends of resistors 10, 20, 30 and 40 by respective parallel pairs of lead wires 10c, 10d; 20c, 20d; 30c, 30d; and 40c, 40d. All of the individual lead wires are identical and are physically located together so that they are at the same temperature. Thus these lead wires will always have equal resistance.

Each of the resistors 10, 20, 30 and 40 is connected at one end to two separate terminals, and therefore each requires two lead wires (suffixes a and b) at that end. At their other end, these resistors are connected to a single terminal, so that strictly speaking only one lead wire would be required. However, two lead wires also are provided (in parallel) at those other ends in order to obtain a value of lead wire resistance of one-half the resistance of a single lead wire. As will be explained, this assures complete freedom from changes in measurement due to changes in resistance of the lead wire, e.g., as a result of ambient temperature variations.

The bridge energizing terminals 42 and 43 are supplied with constant current from a current source 50 which may be of conventional construction and operation. A second source of constant current 90 furnishes current through bridge terminals 42 and 44 primarily to provide a suppressed zero for the average temperature measurement as will be described hereinafter. For the embodiment illustrated, current sources 50 and 90 produce current of the same magnitude.

The bridge output voltage responsive to differential temperature is sensed by voltage measuring means, generally indicated at 60, coupled across the two diagonally-opposed side terminals 46 and 47 of the bridge circuit. The voltage measuring device 60 may be a precision amplifier of conventional construction and operation and is adapted to direct to associated control circuitry an intensified voltage (e.g. −1 to +5 volts) corresponding to differential temperature.

The following analysis of the bridge circuit is provided to demonstrate that the differential temperature measurements developed by the bridge are independent of average temperature and that the effect of changes in the resistance of the lead wires is fully compensated.

First it may be noted that the total series resistance of the two left-hand bridge arms always will be equal to that of the right-hand arms. Thus the current flow into the top terminal 42 divides equally between the two branches so that the current through energizing lead wire 10a is the same as the current flow through the other energizing lead wire 30a and hence the potential at the junction of wire 10a and wire 10b is equal to the potential at the junction of wire 30a and wire 30b. The voltage $e_1$ at either of these junctions (all voltages in this analysis are with respect to top terminal 42) is:

$$e_1 = -iR$$

where $i$ is the current flow from either of the current sources 50 or 90
R is the resistance of a lead wire.

The voltage $e_4$ at the left-hand side terminal 46 is equal to $$e_4 = e_1 - \frac{i}{2}\left(\frac{R}{2} + R_H\right) \qquad (2)$$

where $R_H$ is the resistance of hot resistor 10.
The voltage $e_5$ at the other side terminal 47 is equal to $$e_5 = e_1 - \frac{i}{2}\left(\frac{R}{2} + R_C\right) \qquad (3)$$

where $R_C$ is the resistance of cold resistor 30.
The differential temperature between the two points of interest is represented by the difference in voltage between terminals 46 and 47:

$$\Delta V = e_5 - e_4$$

$$= \left[e_1 - \frac{i}{2}\left(\frac{R}{2} + R_C\right)\right] - \left[e_1 - \frac{i}{2}\left(\frac{R}{2} + R_H\right)\right] \qquad (5)$$

$$= -\frac{i}{2}\left(\frac{R}{2} + R_C\right) + \frac{i}{2}\left(\frac{R}{2} + R_H\right) \qquad (6)$$

$$\Delta V = \frac{i}{2}(R_H - R_C) \qquad (7)$$

It is seen from Equation 7 that the difference in voltage representing the differential temperature being measured is dependent only upon the difference between the particular values of $R_H$ (the resistance of the hot resistors) and $R_C$ (the resistance of the cold resistors), the magnitude of the current flow being constant, and that the relationship between $\Delta V$ and $(R_H - R_C)$ is linear. The span of differential temperature measurement is independent of average temperature, so that the calibration for differential temperature is the same for all average temperatures. Furthermore, the differential voltage $\Delta V$ is seen to be independent of the resistance of the lead wires. The effect of the parallel leads 30c and 30d is cancelled, in Equation 6, by the effect of the parallel leads 10c and 10d.

Measurement of the average temperature is provided by a second voltage measuring means, generally indicated at 70, coupled between terminals 44 and 45. Voltage measuring means 70 may be like voltage measuring means 60 including a conventional precision amplifier to produce an intensified voltage signal corresponding to average temperature. The outputs of amplifier 60 and 70 may be connected in series to provide a composite signal, useful in certain special applications such as to provide a danger warning signal for nuclear reactors.

As shown, one input of the amplifier 70 is connected directly to bridge terminal 45, while the second input is connected through zero-suppression resistor 80 to bridge terminal 44. The second constant-current source 90 is connected between resistor 80 and terminal 42. The electrical resistance of resistor 80 is selected to be equal to the average resistance of one hot-cold pair of resistors 10, 30 or 20, 40 at a predetermined average temperature reference point. As will be evident from the detailed description hereinbelow, this arrangement provides a zero input voltage to the amplifier 70 at the predetermined average temperature. Thus, adjustment of resistor 80 provides a convenient control over the average temperature at which the amplifier signal goes to zero.

The relationship which expresses the average temperature is derived as follows: First, it may be noted that the voltage $e_2$ at terminal 44 is $$e_2 = e_1 = \frac{i}{2}R \qquad (8)$$

where $e_1$, $i$ and R are as referred to hereinabove.
Thus, the voltage $e_3$ at the upper input terminal of amplifier 70 will be $$e_3 = e_1 - \frac{i}{2}R - iR_0 \qquad (9)$$

where $R_0$ is the resistance of resistor 80.

Next, the voltage $e_6$ at the junction of wire 40a and wire 40b is $$e_6 = e_4 - \frac{i}{2}\left(\frac{R}{2} + R_C\right) \quad (10)$$

Since amplifier 70 has a high input impedance and draws substantially no current, the voltage at terminal 45, and at the lower amplifier terminal, is also $e_6$.

The average temperature of the two points of interest is represented by:

$$V_{AV} = e_3 - e_6 \quad (11)$$

Substituting in Equation 11 for $e_3$ and $e_6$:

$$V_{AV} = e_1 - \frac{iR}{2} - iR_0 - e_4 + \frac{i}{2}\left(\frac{R}{2} + R_C\right) \quad (12)$$

Substituting in Equation 12 for $e_4$:

$$V_{AV} = e_1 - \frac{iR}{2} - iR_0 - e_1 + \frac{i}{2}\left(\frac{R}{2} + R_H\right) + \frac{i}{2}\left(\frac{R}{2} + R_C\right) \quad (13)$$

$$= i\left[\frac{R_H + R_C}{2} - R_0\right] \quad (14)$$

It is evident from Equation 14 that the measurement of average temperature varies linearly with average temperature, i.e. there is no change in span with average temperature. Also, the measurement again is independent of the resistance of the lead wires. This result is due to the fact that the net resistance of each parallel pair of lead wires 10c, 10d and 40c, 40d is equal to one-half the resistance of lead wire 10b. As seen from Equation 13, the two R/2 terms corresponding to the two parallel pairs of lead wires are cancelled by the R term corresponding to the lead wire 10b to remove from Equation 13 all the lead wire terms.

It should further be noted that the average temperature signal will be zero when the average resistance of $R_H$ and $R_C$ is equal to $R_0$. Thus the "zero" temperature of the instrument is determined by $R_0$ in accordance with a very simple relationship. Because of this, the range of the instrument can readily be changed by substituting different resistors for $R_0$, as by means of a conventional switch. This feature is of practical importance in many commercial applications, because changes in process operating conditions can readily be accommodated without making complicated alterations to the measuring instruments.

The average temperature may be expressed in more general terms than in Equation 12 by the following:

$$V_{AV} = e_1 - i_3 R_1 - i_2 R_0 - e_4 + i_4\left[\frac{R_2 R_3}{R_2 + R_3} + R_C\right] \quad (15)$$

where $R_1$ is the resistance of lead wire 10b
$i_3$ is the current flow through lead wire 10b
$i_2$ is the current flow from current source 90
$i_4$ is the current flow through the left-hand bridge arms
$R_2$ is the resistance of lead wire 40c
$R_3$ is the resistance of lead wire 40d Substituting in Equation 15 for $e_4$:

$$V_{AV} = e_1 - i_3 R_1 - i_2 R_0$$

$$- e_1 + i_4\left[\frac{R_4 R_5}{R_4 + R_5} + R_H\right] + i_4\left[\frac{R_2 R_3}{R_2 + R_3} + R_C\right] \quad (16)$$

where $R_4$ is the resistance of lead wire 10c
$R_5$ is the resistance of lead wire 10d If the total series resistance of the two left-hand bridge arms is equal to that of the right-hand arms, the current flow through lead wire 10b ($i_3$) is equal to the current flow in lead wire 30b and each of these current flows, therefore, is equal to $i_2/2$. Furthermore, the current flow from sources 50 and 90 divides evenly so that the flow through each of the lead wires 10a and 30a is $$\frac{i_1 + i_2}{2}$$

where $i_1$ is the current flow from source 50.

Summing the currents at the junction of wires 10a and 10b:

$$\frac{i_1 + i_2}{2} = i_3 + i_4 \quad (17)$$

$$i_4 = \frac{i_1 + i_2}{2} - i_3 \quad (18)$$

Substituting in Equation 18 for $i_3$:

$$i_4 = \frac{i_1 + i_2}{2} - \frac{i_2}{2} \quad (19)$$

$$= \frac{i_1}{2} \quad (20)$$

Substituting in Equation 16 for $i_3$ and $i_4$:

$$V_{AV} = -\frac{i_2 R_1}{2} - i_2 R_0 + \frac{i_1}{2}\left[\frac{R_4 R_5}{R_4 + R_5} + \frac{R_2 R_3}{R_2 + R_3}\right] + \frac{i_1}{2}(R_H + R_C) \quad (21)$$

In order to render $V_{AV}$ independent of the resistance of the lead wires:

$$\frac{i_1}{2}\left[\frac{R_2 R_3}{R_2 + R_3} + \frac{R_4 R_5}{R_4 + R_5}\right] = \frac{i_2 R_1}{2} \quad (22)$$

The voltage drop across the two parallel pairs of lead wires is equal and opposite to the voltage drop across the lead wire 10b. If the resistance of all the lead wires is the same, the voltage drop across one of the parallel pairs of lead wires is equal and opposite to one-half the voltage drop across the lead wire 10b.

If instead of using parallel pairs of lead wires to connect resistors 10, 20, 30 and 40 to junctions 46 and 47 single leads are used, Equation 22 becomes $$\frac{i_1}{2}(R_2 + R_4) = \frac{i_2 R_1}{2} \quad (23)$$

If $R_2$ is equal to $R_4$:

$$\frac{2 R_2 i_1}{2} = \frac{i_2 R_1}{2} \quad (24)$$

$$R_2 i_1 = \frac{i_2 R_1}{2} \quad (25)$$

It is seen from Equation 25 that by doubling the magnitude of the current from source 90, single leads having the same resistance as each of the double leads at the opposite ends of the hot and cold resistors may be used to connect these resistors to junctions 46 and 47.

While there has been described what is at present considered to be the preferred embodiment of this invention it will be obvious to those skilled in the art that various changes and modifications may be made therein without departing from the invention.

I claim:

1. Apparatus for making measurements respecting two separate process conditions and comprising:

first and second variable resistors responsive to such process conditions and each having a resistance representative of the first of said two conditions;

third and fourth variable resistors responsive to such process conditions and each having a resistance representative of the second of said two conditions;

means for coupling together said first, second, third and fourth resistors to provide a four-armed bridge arrangement having first and second pairs of opposite terminals, said first and second resistors being opposite one another and said third and fourth resistors being opposite one another, between said first and second resistors;

a source of constant-current coupled between one of said pairs of bridge terminals;

and a voltage measuring device coupled between one of said pairs of bridge terminals.

2. Apparatus for making measurements respecting two separate process conditions and comprising:

first and second variable resistors each having a resistance responsive to and representative of the first of said two conditions;

third and fourth variable resistors each having a resistance responsive to and representative of the second of said two conditions;

first, second, third and fourth terminals;

circuit means coupling said resistors between said terminals to form a four-armed bridge arrangement with said first and second resistors opposite one another and said third and fourth resistors opposite one another, said first and second terminals defining a first pair of opposite bridge terminals, said third and fourth terminals defining a second pair of opposite bridge terminals intermediate said first pair of terminals, said first resistor being coupled between said fourth and first terminals, said third resistor being coupled between said first and third terminals, said second resistor being coupled between said third and second terminals, and said fourth resistor being coupled between said second and fourth terminals;

a source of constant current coupled between one of said pairs of opposite terminals to energize said bridge;

and a voltage measuring device coupled between one of said pairs of opposite bridge terminals to provide a measurement signal responsive to said process conditions.

3. Apparatus as claimed in claim 2, wherein the resistors are responsive to temperature conditions.

4. Apparatus as claimed in claim 3, wherein said current source is coupled to said first pair of terminals and said voltage measuring device is coupled to said second pair of terminals, whereby to develop a measurement voltage corresponding to differential temperature.

5. Apparatus as claimed in claim 3, wherein said current source and said voltage measuring device both are coupled to said first pair of bridge terminals, whereby to develop a measurement voltage corresponding to the average value of the two temperatures.

6. Apparatus as claimed in claim 3, including a second voltage measuring device, said first and second measuring devices being coupled respectively to said first and second pairs of bridge terminals to measure both differential and average temperatures at the same time.

7. Apparatus as claimed in claim 2, wherein both said voltage measuring device and said source of current are coupled to said first pair of terminals, so as to produce an indication of the average value of said two process conditions, a range-setting resistor connected in series between said voltage measuring device and said first pair of terminals, and a second source of constant current coupled to said range-setting resistor to produce a flow of current therein, thereby to establish a zero-voltage input level at said measuring device corresponding to a predetermined average value of said two process conditions.

8. Apparatus as claimed in claim 7, wherein the first pair of terminals are connected to the corresponding ends of the associated resistors by first and second pairs of lead wires respectively, said lead wires carrying the current from said first source of current;

one end of said range-setting resistor being coupled to the first terminal of said first pair of terminals by a third pair of lead wires connected to corresponding ends of the resistors associated with said first terminal, said first, second and third pairs of lead wires all having identical individual resistances; the other end of said range-setting resistor being coupled through said second source of current to said first terminal of said first pair of terminals, whereby current from said second source flows through both said first and third pairs of lead wires.

9. Apparatus as claimed in claim 8, including a fourth pair of lead wires connected respectively to the corresponding ends of the resistors associated with the second of said first pair of terminals, the remote ends of said fourth pair of lead wires being connected together at a common junction; said voltage measuring device being coupled between said common junction and said other end of said range-setting resistor.

10. Apparatus for making measurements respecting two separate process conditions and comprising:

first and second variable resistors each having a resistance responsive to and representative of the first of said two conditions;

third and fourth variable resistors each having a resistance responsive to and representative of the second of said two conditions;

first, second, third, fourth, fifth and sixth terminals;

first circuit means for individually connecting a first end of each of said first and third resistors to said first and second terminals;

second circuit means for individually connecting a first end of each of said second and fourth resistors to said third and fourth terminals;

third circuit means for connecting the second end of said first resistor and the second end of said fourth resistor to said fifth terminal;

fourth circuit means for connecting the second end of said second resistor and the second end of said third resistor to said sixth terminal;

a first source of constant current coupled between said first and third terminals;

a second source of constant current coupled between said first and second terminals;

and a voltage measuring device coupled between said second and fourth terminals.

11. Apparatus as claimed in claim 10, wherein the resistance of the circuit means connecting any of said resistors to said fifth and sixth terminals is equal to one-half the resistance of the circuit means connecting any of said resistors to said second and fourth terminals.

12. Apparatus as claimed in claim 10, wherein each of said resistors is provided with a pair of lead wires at each end by means of which said resistors are connected to the respective terminals and each lead wire has the same resistance.

13. Apparatus as claimed in claim 12, wherein said lead wires at said first ends of said resistors individually connect said resistors to said first, second, third and fourth terminals and said lead wires at said second ends of said resistors are connected in parallel pairs to connect said resistors to said fifth and sixth terminals.

14. Apparatus as claimed in claim 10, wherein the voltage drop across the circuit means connecting any of said resistors to said fifth and sixth terminals is equal and opposite to one-half the voltage drop across the circuit means connecting any of said resistors to said second and fourth terminals.

15. Temperature measuring apparatus comprising a balanced bridge having four terminals, four temperature-responsive resistors for the respective arms of said bridge, a first set of lead wires connecting an opposite two of said terminals to corresponding ends of said resistors, a second set of lead wires connecting the other two terminals to the other ends of said resistors to complete the balanced bridge, a source of constant current connected to said first-mentioned two terminals to energize said bridge, a voltage measuring device, and a third set of lead wires connecting said voltage measuring device to said corresponding ends of said resistors to supply to said device a voltage proportioned to the average temperature.

16. Apparatus as claimed in claim 15 wherein said third set of lead wires includes a first sub-set connecting one terminal of said voltage measuring device to said corresponding ends of two of said resistors and a second sub-set connecting the other terminal of said device to said corresponding ends of the other two of said resistors; and including second constant current means connected to at least one of said sub-sets of said third set of lead wires to produce a flow of current through the individual lead wires thereof resulting in a voltage drop thereacross equal and opposite to the voltage drop across said second set of lead wires, whereby changes in resistance of all of the lead wires due to environmental conditions will not affect the temperature measurement.

17. Apparatus as claimed in claim 16, wherein said second source of constant current is connected to one of said first-mentioned two terminals to produce a flow of current through the lead wires of said first set which are connected to said one terminal and also through the corresponding lead wires of said third set.

18. Apparatus as claimed in claim 17, wherein each of said second set of lead wires has an ohmic resistance which is related to the ohmic resistance of the current-carrying lead wires of said third set in accordance with the relationship between the magnitudes of the currents of said two sources of constant current.

19. Apparatus as claimed in claim 18, wherein said sources of constant current provide equal currents, said second set of lead wires comprising parallel-connected leads having a net resistance one-half that of the current-carrying lead wires of said third set.

20. Apparatus as claimed in claim 16, including a range-setting resistor connected in series with said second source of constant current.

21. Measuring apparatus comprising a balanced four-terminal bridge having first, second, third and fourth active resistor arms the resistances of which are variable with changes in respective influencing conditions; a first set of lead wires connecting one end of each of said first and second resistor arms to one bridge terminal and connecting one end of each of said third and fourth resistor arms to the bridge terminal opposite said one terminal; second circuit means connecting the other ends of said first and fourth resistor arms together and third circuit means connecting the other ends of said second and third resistor arms together to complete the bridge; a source of constant current connected to said two bridge terminals to supply current of constant magnitude to all of said resistors; a voltage measuring device; means connecting one terminal of said voltage measuring device to said one end of each of said first and second resistor arms and the other terminal of said voltage measuring device to said one end of each of said third and fourth resistor arms, whereby said voltage measuring device will sense the voltage developed across said resistor arms by the flow of current from said current source, thereby to produce a measurement indication of the average value of the conditions influencing said resistor arms.

22. Apparatus as claimed in claim 21, wherein said first and third resistor arms are responsive to one temperature condition and said second and fourth resistor arms are responsive to another temperature condition; a second voltage measuring device; means connecting one terminal of said second voltage measuring device to a circuit point intermediate said other ends of said first and fourth resistor arms; and means connecting the other terminal of said second voltage measuring device to a circuit point intermediate said other ends of said second and third resistor arms, thereby to provide both average and differential temperature measurements with a single bridge.

References Cited

UNITED STATES PATENTS

| | | | |
|---|---|---|---|
| 1,099,199 | 6/1914 | Parker | 73—342 |
| 2,249,751 | 7/1941 | Doll | 73—362 |
| 2,676,489 | 4/1954 | Basham | 73—362 |
| 2,976,729 | 3/1961 | Smith | 73—342 |
| 3,067,613 | 12/1962 | Rasmussen et al. | 73—342 |
| 3,161,821 | 12/1964 | Price et al. | 323—75 |

LOUIS R. PRINCE, Primary Examiner

D. E. CORR, Assistant Examiner

U.S. Cl. X.R.

73—362; 323—75